(12) United States Patent
Enescu

(10) Patent No.: US 11,917,473 B2
(45) Date of Patent: Feb. 27, 2024

(54) MODEM ARRANGEMENT

(71) Applicant: NXP USA, Inc., Austin, TX (US)

(72) Inventor: Andrei Alexandru Enescu, Bucharest (RO)

(73) Assignee: NXP USA, Inc., Austin, TX (US)

( * ) Notice: Subject to any disclaimer, the term of this patent is extended or adjusted under 35 U.S.C. 154(b) by 362 days.

(21) Appl. No.: 17/303,125

(22) Filed: May 20, 2021

(65) Prior Publication Data

US 2021/0385713 A1  Dec. 9, 2021

(30) Foreign Application Priority Data

Apr. 16, 2020 (RO) ................................. A202000211

(51) Int. Cl.
*H04W 36/08* (2009.01)
*H04W 36/00* (2009.01)
*H04W 84/04* (2009.01)

(52) U.S. Cl.
CPC ....... *H04W 36/08* (2013.01); *H04W 36/0085* (2018.08); *H04W 84/042* (2013.01)

(58) Field of Classification Search
CPC ............. H04W 36/08; H04W 36/0085; H04W 84/042; H04W 88/06; H04W 36/0069
See application file for complete search history.

(56) References Cited

U.S. PATENT DOCUMENTS

| 10,873,958 | B1* | 12/2020 | Mansour | ........... H04W 72/1268 |
| 2019/0215711 | A1 | 7/2019 | Tsai et al. | |
| 2019/0313272 | A1* | 10/2019 | Zhou | ...................... H04W 24/10 |
| 2020/0367240 | A1* | 11/2020 | Sung | ....................... H04W 88/06 |
| 2021/0149009 | A1* | 5/2021 | Modarres Razavi | ........................ H04W 64/003 |

FOREIGN PATENT DOCUMENTS

WO    PCT-2019/108001 A1    6/2019

* cited by examiner

*Primary Examiner* — Chi H Pham
*Assistant Examiner* — Ji-Hae Yea

(57) ABSTRACT

A modem for a non-standalone network includes a 5G-NR modem and an E-UTRA modem. The 5G-NR modem includes a cell search module which determines first timing information. The first timing information includes first times indicative of the times of receipt of one or more first radio frames from a first 5G-NR base station measured relative to a network time. The 5G-NR modem also provides for the sending of system frame timing difference (SFTD) information for the first base station to a network controller by sending the first timing information to the E-UTRA modem. The E-UTRA modem then determines and forwards the SFTD information using the first timing information and second timing information. The second timing information is determined by the E-UTRA modem and includes second times indicative of the times of receipt of one or more second radio frames from a second E-UTRA base station.

16 Claims, 3 Drawing Sheets

MODEM ARRANGEMENT

CROSS-REFERENCE TO RELATED APPLICATIONS

This application claims the priority under 35 U.S.C. § 119 of Romania application no. A202000211, filed on 16 Apr. 2020, the contents of which are incorporated by reference herein.

FIELD

The present disclosure relates to a modem and, in particular to a 5G-NR modem and also to a 4G E-UTRA modem. The disclosure also relates to a non-standalone combination of said 5G-NR modem and said 4G E-UTRA modem. It also relates to associated computer programs and methods.

BACKGROUND

5G-NR is a radio access technology for mobile communication networks. 5G-NR may be deployed in a non-standalone network arrangement. The non-standalone network arrangement refers to an option of 5G-NR deployment that uses a control plane of an existing Long Term Evolution (LTE) network for control functions (e.g. for network signalling), while the 5G-NR network provides the data plane (also known as user plane). A non-standalone network user device may therefore have both a 4G modem, or more specifically, an E-UTRA modem in combination with a 5G-NR modem.

SUMMARY

According to a first aspect of the present disclosure there is provided a modem for a 5G New Radio, 5G-NR, non-standalone network, the modem comprising a 5G-NR modem configured to receive radio frames from the 5G-NR network, the modem including a 5G-NR cell search module configured to:
  determine first timing information, the first timing information comprising one or more first times, $t_k$, indicative of the time of receipt of a respective one or more first radio frames, $n_k$, from a first base station of the 5G-NR network, each radio frame having encoded therein a first system frame number, SFN, the time $t_k$ measured relative to a network time established by the 5G NR network and derived by the modem using, at least in part, information encoded in the radio frames;
  provide for sending of system frame timing difference, SFTD, information for the first base station to a network controller by sending said first timing information to a second modem comprising an Evolved Universal Terrestrial Access, E-UTRA, network modem for determination and forwarding of the SFTD information by said second modem to the network controller using said first timing information and second timing information determined by the E-UTRA modem, the second timing information comprising one or more second times indicative of the time of receipt of a respective one or more second radio frames, m, from a second base station of the E-UTRA network, each radio frame having encoded therein a second system frame number, SFN.

Thus, in one or more examples, the system frame timing difference, SFTD, information defined in the 3GPP specification TS38.215 may be determined and sent more efficiently by the 5G-NR modem being configured to provide said first timing information through a software interface to the E-UTRA modem for the E-UTRA modem to determine and forward the SFTD information on behalf of the 5G-NR modem.

It will be appreciated that the time $t_{LTE}$ may be measured relative to a network time established by the 4G E-UTRA network and derived by the second modem using, at least in part, information encoded in the radio frames received thereby.

It will be appreciated that the network time of the 5G-NR network may be synchronised with the network time of the 4G E-UTRA network.

In one or more embodiments, the 5G-NR cell search module is configured to:
  determine third timing information, the third timing information comprising one or more third times, $t_k$, indicative of the time of receipt of a respective one or more radio frames, $n_{kn}$, from a third base station, different to the first base station, of the 5G-NR network, each radio frame having a third system frame number, SFN, the time $t_k$ measured relative to said network time established by the 5G NR network; and
  provide for sending of system frame timing difference, SFTD, information for the third base station to a network controller by sending said third timing information to the second modem for determination of the SFTD information for the third base station by said second modem, and forwarding to the network controller.

In one or more embodiments, the first base station comprises the base station to which the modem is currently connected for transmitting and receiving of data and the third base station comprises a neighbouring 5G-NR base station to which the modem can form a connection during a handover process.

In one or more embodiments, the SFTD information related to the first base station comprises:
  a system frame offset comprising a difference between the second system frame number of one of the second radio frames from the E-UTRA network and the first system frame number of one of the first radio frames defined in the first timing information, said one of the first radio frames comprising one that the start of which is received closest in time to the time said one of the second radio frame of the E-UTRA network is received by the E-UTRA modem; and
  a frame boundary offset comprising a time difference between a start of a radio frame received from the E-UTRA network and a start of one of the first radio frames defined in the first timing information, said one of the first radio frames comprising one that the start of which is received closest in time to the time the received radio frame of the E-UTRA network is received.

In one or more embodiments, the SFTD information related to the third base station comprises:
  a system frame offset comprising a difference between the second system frame number of one of the second radio frames from the E-UTRA network and the third system frame number of one of the third radio frames defined in the third timing information, said one of the third radio frames comprising one that the start of which is received closest in time to the time said one of the second radio frame of the E-UTRA network is received by the E-UTRA modem; and a frame boundary offset comprising a time difference between a start of one of the radio frames received from the E-UTRA network and a start of one of the third radio frames defined in the third timing information, said one of the third radio frames comprising one that the start of which is received closest in time to the time said one of the second radio frame of the E-UTRA network is received.

In one or more embodiments, the modem is provided in combination with a computer program product, said computer program product comprising computer program code for storing in a memory of said second, E-UTRA, modem to cause said second modem, when said computer program code is executed thereby, to:
- receive said first timing information from the modem;
- determine SFTD information based on the first timing information received from the modem and second timing information determined by said second modem; and
- forward the determined SFTD information to the network controller.

In one or more examples, the determined SFTD information is forwarded to the network controller using the E-UTRA network.

In one or more embodiments, the 5G-NR modem is absent an E-UTRA network cell search module configured to determine said second timing information.

According to a second aspect of the present disclosure there is provided the modem of the first aspect in combination with said second modem to thereby form a non-standalone network user device.

In one or more embodiments, the 5G-NR network and the E-UTRA network are the same network and wherein the network provides a 5G-NR based connection to said network by the first base station and provides an E-UTRA based connection to said network by the second base station.

In one or more examples, the network time may be established by the network.

According to a third aspect of the present disclosure there is provided a modem for an Evolved Universal Terrestrial Access, E-UTRA, non-standalone network, the modem comprising a E-UTRA modem configured to receive radio frames from the E-UTRA network, the modem comprising an interface configured to receive at least first timing information from a 5G-NR modem and a determination module, the determination module configured to:
- determine SFTD information based on the first timing information received via said interface and second timing information determined by the E-UTRA modem; and
- forward said SFTD information to a network controller via a second base station of the E-UTRA network;
- wherein said first timing information comprises one or more first times, $t_0$, indicative of the time of receipt, by the 5G-NR modem, of a respective one or more first radio frames, $n_k$, from a first base station of the 5G NR network, each radio frame having a first system frame number, SFN, the time $t_0$ measured relative to a network time established by the 5G NR network; and
- wherein said second timing information comprises one or more times indicative of the time of receipt, $t_{LTE}$, by said E-UTRA modem, of one or more radio frames from the second base station of the E-UTRA network, each radio frame having a system frame number, SFN, the time measured relative to a network time established by the E-UTRA network and derived by the modem using, at least in part, information encoded in the radio frames received by the E-UTRA modem.

In one or more embodiments, the modem is configured to receive, via the interface, third timing information from the 5G-NR modem, the third timing information comprising one or more third times, $t_k$, indicative of the time of receipt of a respective one or more radio frames, $n_{kn}$, from a third base station, different to the first base station, of the 5G-NR network, each radio frame having a third system frame number, SFN, the time $t_k$ measured relative to said network time established by the 5G NR network.

In one or more embodiments, the modem is configured to determine:
a Time Advance on the Pcell, $TA_{PCell}$, value, wherein:

$$TA_{PCell}=t_{LTE}-\text{SFNtick}$$

wherein $t_{LTE}$ comprises the time of receipt of the start of one of the radio frames by the second modem and SFNtick comprises the time of a marker of the network time; and
a Time Advance on the primary 5G Pcell, $TA_{NR}$, value wherein:

$$TA_{NR}=t_0-\text{SFNtick}$$

wherein $t_0$ comprises the time of receipt of the start of one of the 5G-NR radio frames from the first timing information and SFNtick comprises the time of the marker of the network time;
a Time Offset $TO_k$ between at least one other third base station and the first base station wherein:

$$TO_k=t_k-t_0$$

where $t_0$ comprises the time of receipt of the start of one of the 5G-NR radio frames from the first base station and $t_k$ comprises the time of receipt of the start of one of the 5G-NR radio frames from the third base station; and
the second modem is configured to determine the SFTD information comprising one or both of:
$TA_{NR}-TA_{PCell}$ in respect of the first base station; and $$FBO_k=t_k-t_0-(TA_{PCell}-TA_{NR}).$$

According to a fourth aspect of the present disclosure there is provided a computer program product comprising computer program code configured to be stored in memory of and executed by a modem for an Evolved Universal Terrestrial Access, E-UTRA, non-standalone network, the modem comprising a E-UTRA modem, wherein the computer program code is configured to cause the E-UTRA modem to:
- receive first timing information from an interface configured to couple to a 5G-NR modem;
- determine SFTD information based on the first timing information received via said interface and second timing information determined by the E-UTRA modem; and
- forward said SFTD information to a network controller;
- wherein said first timing information comprises one or more first times, $t_k$, indicative of the time of receipt, by the 5G-NR modem, of a respective one or more first radio frames, $n_k$, from a first base station of the 5G NR network, each radio frame having a first system frame number, SFN, the time $t_k$ measured relative to a network time established by the 5G NR network; and.
- wherein said second timing information comprises one or more times indicative of the time of receipt, by said E-UTRA modem, of one or more radio frames from a second base station of the E-UTRA network, each radio frame having a system frame number, SFN, the time measured relative to a network time established by the E-UTRA network.

According to a fifth aspect of the present disclosure there is provided a method of operation of a user device comprising a modem for a 5G New Radio, 5G-NR, non-standalone network, the modem comprising a 5G-NR modem configured to receive radio frames from the 5G-NR network, the modem including a 5G-NR cell search module configured to perform the following method:

determining first timing information, the first timing information comprising one or more first times, $t_k$, indicative of the time of receipt of a respective one or more first radio frames, $n_k$, from a first base station of the 5G-NR network, each radio frame having encoded therein a first system frame number, SFN, the time $t_k$ measured relative to a network time established by the 5G NR network and derived by the modem using, at least in part, information encoded in the radio frames;

providing for sending of system frame timing difference, SFTD, information for the first base station to a network controller by sending said first timing information to a second modem comprising an Evolved Universal Terrestrial Access, E-UTRA, network modem for determination and forwarding of the SFTD information by said second modem to the network controller using said first timing information and second timing information determined by the E-UTRA modem, the second timing information comprising one or more second times, $t_{LTE}$, indicative of the time of receipt of a respective one or more second radio frames, m, from a second base station of the E-UTRA network, each radio frame having encoded therein a second system frame number, SFN.

In one or more embodiments, the user device includes the second E-UTRA modem configured to receive radio frames from the E-UTRA network, the modem comprising an interface configured to receive at least the first timing information from the 5G-NR modem and a determination module, the determination module configured to perform the following method:

determining SFTD information based on the first timing information received via said interface and second timing information determined by the E-UTRA modem; and forwarding said SFTD information to a network controller via a second base station of the E-UTRA network.

In one or more examples, the network controller comprises an entity of one or more of the first, second or third base stations. Thus, in one or more examples, the network controller is remote from the first modem and the second modem.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

The present disclosure relates to a 5G New Radio, 5G-NR, non-standalone network arrangement and, in particular, to a user device for connecting to such a network arrangement. In such a network arrangement, a user device for connecting to a 5G new radio, 5G-NR, network may be configured to connect to both a 4G, Evolved Universal Mobile Telecommunications System Terrestrial Radio Access, E-UTRA, network and to the 5G-NR network. The user device therefore has dual connectivity and includes an E-UTRA modem and a 5G-NR modem. The user device and the network arrangement may be configured to use the 4G E-UTRA network (or, in other words, a connection to an E-UTRA base station) for network signalling, e.g. control or control-plane messages, relating to both the 4G E-UTRA network connection and the 5G-NR network connection. The 5G-NR network connection (or, in other words, the connection to a 5G-NR base station) may be used for sending and receiving user data e.g. data other than the network signalling. Accordingly, this may be understood as the control plane of the 5G-NR network being managed by a radio resource control, RRC, of the E-UTRA modem and the data plane of the 5G-NR is managed by the 5G-NR modem.

Figure 1:
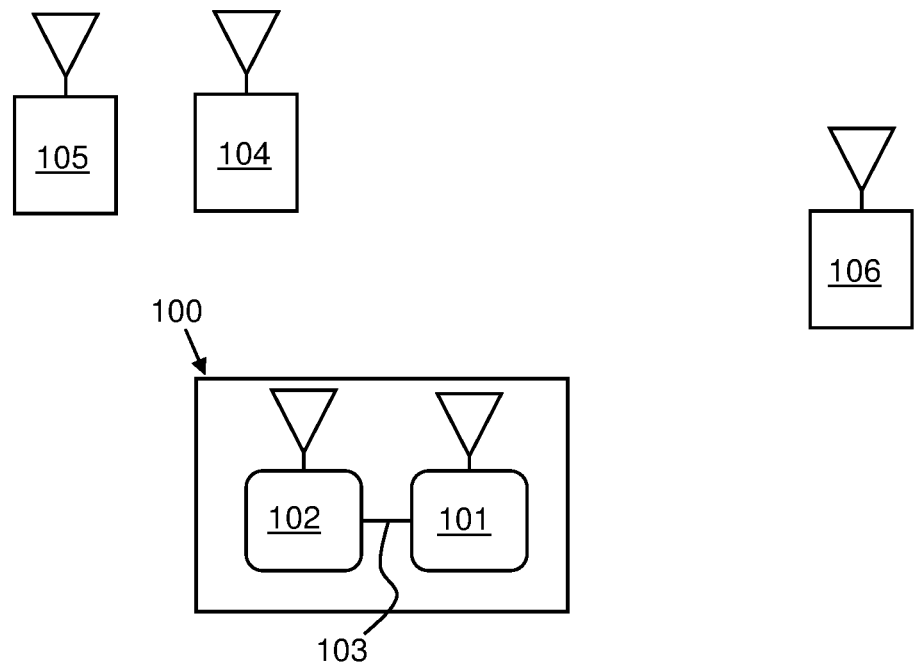
FIG. 1 shows an example embodiment of a non-standalone network user device comprising a co-located E-UTRA modem and a 5G-NR modem along with example base stations.

Example FIG. 1 shows a user device 100, also known in the art as Customer Premise Equipment (CPE) or User Equipment (UE) that normally connects to both a 4G E-UTRA network for sending and receiving of control messages and to 5G-NR network for user data traffic. The 4G E-UTRA network may also act as a fallback option for data traffic should the 5G-NR network be unavailable.

The user device 100 comprises a 5G-NR modem 101 and a 4G E-UTRA modem 102. The modems 101, 102 may be co-located and may include an interface 103, which may be software controlled, therebetween. It is known for the modems 101, 102 to be integrated together, such as on a single die or arrangement of dies and therefore they may share resources, such as a timing reference. However, in one or more embodiments described herein, the modems 101, 102 may be separate devices, such as with separate timing references. The software controlled interface 103 may provide for the exchange of information, such as network information between the modems 101, 102. As such the interface may be non-real time in that there is no timing calibration of the interface 103 such that the time of receipt of a message through the interface 103 is not reliably indicative of the time of receipt of the information contained in said message by the modem.

Example FIG. 1 shows a first base station 104, also known as a base transceiver station, BTS, that provides coverage for the 5G-NR network. The 5G-NR modem 101 may be currently connected to the first base station 104 for exchange of data traffic. As such, the first base station 104 may be considered the primary 5G-NR base station in some examples. A second base station 105 is also shown that provides coverage for the E-UTRA network. The 4G E-UTRA modem 102 may be currently connected to the second base station 105 for exchange of at least control plane messages, such as via an X2 interface, as will be known to those skilled in the art. Example FIG. 1 also shows a neighbouring, third base station 106 providing coverage for the 5G-NR network. In one or more examples, the first base station 104 comprises the base station to which the 5G-NR modem is currently connected for transmitting and receiving of data and the third base station 106 comprises a neighbouring 5G-NR base station to which the 5G-NR modem can form a connection during a hand-over process. However, in other examples, the first base station and the third base station may comprise base stations to which the 5G-NR modem can form a connection during a hand-over process or to which the 5G-NR modem may form an initial connection, such as on start-up.

It will be appreciated that while only one neighbouring base station 106 is shown, there may be a plurality of neighbouring base stations for the 5G-NR network. While the above describes the 5G-NR network and E-UTRA network as separate networks, they may be part of one communication network. Accordingly, the communication network may be configured to provide a 5G-NR based connection to said network by at least the first base station 104 and the third base station 106 and provide an E-UTRA based connection to said network by at least the second base station 105.

There are network signalling requirements imposed by the specifications for such non-standalone network arrangements. The 3GPP (3rd Generation Partnership Project) specification TS 38.215 imposes mandatory measurements to be performed by the 5G-NR modem. Among these, there is the System Frame Timing Difference (SFTD) measurement in § 5.1.14, which relates to the observed System Frame Number (SFN) and offset between a system frame received from a base station of the E-UTRA network and a system frame received from a base station of the 5G-NR network.

It may be expected that timing measurements for the E-UTRA radio frames is performed by the E-UTRA modem 102 and the timing measurements for the 5G-NR radio frames are performed by the 5G-NR modem 101. However, the E-UTRA modem 102 may be distinct equipment with a different time reference relative to the 5G-NR modem 101. In fact, it may be so that they do not share any common resources as these modems could come from different vendors. In examples where the user device 100 is Customer Premises Equipment, it is fairly common for the modems to be from different vendors. In one or more examples, the 4G E-UTRA modem may comprise a USB (Universal Serial Bus) dongle that may be plugged into a card that hosts the 5G-NR modem. Accordingly, the mandated SFTD measurements could be understood to require the 5G-NR modem to make timing measurements for the system radio frames from both the E-UTRA base station and the 5G-NR base stations.

Figure 2:
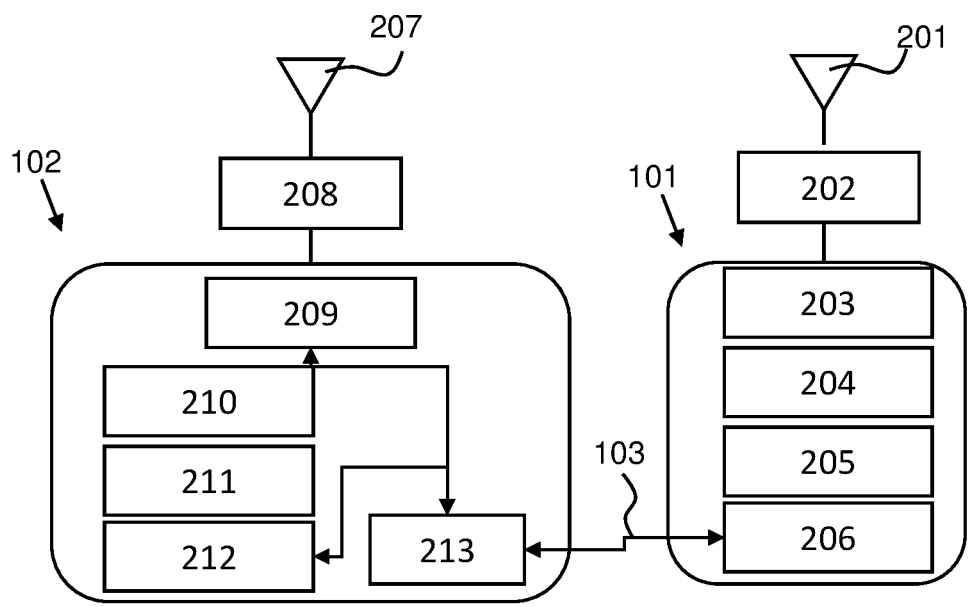
FIG. 2 shows the example non-standalone network user device in more detail illustrating the protocol stacks provided therein.

Example FIG. 2 shows a more detailed schematic diagram of the modems 102, 101 in terms of their protocol stacks and the interface 103 between them. The 5G-NR modem comprises an antenna 201 coupled to the radio transceiver circuitry 202 for the sending and receiving of wireless signalling to and from the 5G-NR network and, in particular, the first base station 104 and the third base station 106. The 5G-NR modem 101 further comprises a 5G-NR physical layer controller (PHY) 203, a 5G-NR medium access controller (MAC) 204, a 5G-NR radio link controller (RLC) 205 and a 5G-NR Packet Data Convergence Protocol controller (PDCP) 206. It will be appreciated that these controllers are represented schematically as separate elements to represent the functionality of the protocol stack, but in practice they may be physically combined in a variety of combinations.

The 4G E-UTRA modem 102 comprises an antenna 207 coupled to radio transceiver circuitry 208 for the sending and receiving of wireless signalling to and from the 5G-NR network and, in particular, the second base station 105. The E-UTRA modem 102 further comprises an E-UTRA physical layer controller (PHY) 209, an E-UTRA medium access controller (MAC) 210, an E-UTRA radio link controller (RLC) 211 and an E-UTRA Packet Data Convergence Protocol controller (PDCP) 212. The E-UTRA modem 102 further comprises a Radio Resource Control controller 213. The 5G-NR Packet Data Convergence Protocol controller (PDCP) 206 is configured to communicate with the Radio Resource Control controller 213 via the interface 103. It will be appreciated that these controllers are represented schematically as separate elements to represent the functionality of the protocol stack, but in practice they may be physically combined in a variety of combinations. The interface 103 may, in one or more examples, be between the 5G-NR Packet Data Convergence Protocol controller (PDCP) 206 and the Radio Resource Control controller 213 and control plane signalling information may be passed therebetween. This disclosure may be considered to relate to the modification of the control plane protocol stack to provide the SFTD measurements.

It will be appreciated that a protocol stack has a control plane (where signalling information is passed) and a data plane (where data packets go through). FIG. 2 shows the data plane protocol stack comprising components 209, 210, 211 and 212 and the control plane protocol stack comprising the RRC 213 with E-UTRA physical layer controller (PHY) 209. The components 203, 204, 205, 206 comprise part of the data plane stack of the 5G-NR modem.

Figure 3:
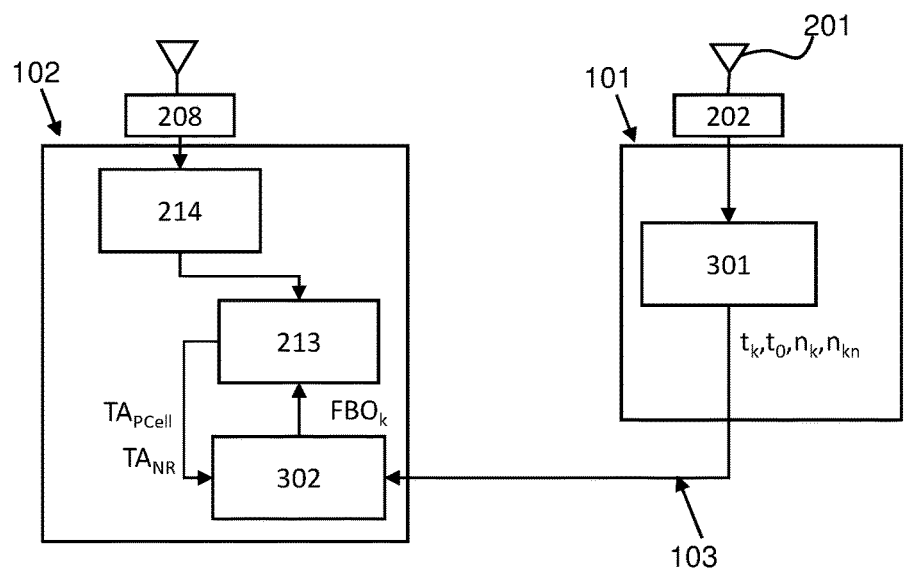
FIG. 3 shows a simplified view of the example non-standalone network user device and the modems thereof to illustrate the functionality thereof.

Example FIG. 3 shows the example E-UTRA modem 102 and the 5G-NR modem 101 with modules that provide the functionality of an embodiment of the disclosure. In particular, there is shown a part of a non-standalone network arrangement comprising the 5G-NR modem 101 configured to receive radio frames from the 5G-NR network/base station 104 and the E-UTRA modem 102 configured to receive radio frames from the E-UTRA network/base station 105. As was mentioned above, the 5G-NR modem 101 and the 4G E-UTRA modem 102 may be provided by different vendors but, in a non-standalone network, they are required to work together to provide connectivity to the communication network using both the E-UTRA based connection to the second base station 105 and the 5G-NR based connection to the first (or third) base station 104. First, we will consider the functionality of the 5G-NR modem 102.

The 5G-NR modem 101 includes a 5G-NR cell search module 301. The 5G-NR cell search module 301 may be considered part of the control plane protocol stack of the 5G-NR modem. The 5G-NR cell search module 301 may be configured to receive radio frames from one or more base stations within range of the 5G-NR modem 101 and determine information about the one or more base stations and/or the radio frames received therefrom. The information may include, at least in part, timing information, which may be required for determining the SFTD information.

In particular, the 5G-NR cell search module 301 may be configured to determine timing information about one or more neighbouring base stations and/or the radio frames received therefrom and may receive or determine timing information about the base station to which the modem 101 has an active connection and/or the radio frames received therefrom. In one or more examples, said timing information is related to the time of receipt of radio frames and a system frame number of the radio frames. The timing information may be required for determining SFTD information for each of the one or more base stations in range of the 5G-NR modem 101. In general terms, the 5G-NR cell search module 301 is configured to search for neighbouring base stations to which the 5G-NR modem may wish to connect to in the future, such as during a process known in the art as handover or hand-off, or for base station with which to form an initial connection.

In prior implementations, the 5G-NR modem may have additionally included a 4G E-UTRA cell search module for determining timing information about the 4G E-UTRA base station and/or the radio frames received therefrom. The timing information from the 5G-NR cell search module 301 and the corresponding 4G E-UTRA cell search module could then be combined to determine the SFTD information. However, in this example, the 5G-NR modem 101 is absent an E-UTRA network cell search module configured to determine timing information of radio frames received from the E-UTRA network or, more particularly, the E-UTRA base station 105. As the 5G-NR modem 101 only implements a 5G-NR cell search module 301, this may save on digital signal processing cycles, memory, power consumption and/or die area in the 5G-NR modem 101.

In more detail, the 5G-NR cell search module 301 is configured to determine first timing information, the first timing information comprising one or more first times, $t_k$, indicative of the time of receipt of a respective one or more first radio frames, $n_k$, from a first base station of the 5G-NR network, each radio frame having encoded therein a first system frame number, SFN, $n_k$. The time $t_k$ may be measured relative to a network time established by the 5G NR network or more generally the communication network to which the 5G-NR base station provides access. The network time may be derived by the modem 101 using, at least in part, information encoded in the radio frames. It will be appreciated that how the modem 101 obtains information to derive the network time will be known to those skilled in the art and is outside the scope of this disclosure. However, to provide a brief explanation, the communication network usually establishes the timing based on a universal Global Positioning System (GPS) tick. Base stations (towers or small cells) belonging to the network will synchronize their transmission to this tick. User devices 100 (such as CPEs or UEs) or the modems thereof that connect to the communication network may be configured to derive this timing by detecting some special patterns (in 5G NR these are called preambles: PSS, SSS—Primary/Secondary Synchronization Sequence) in the signalling from the base station 104, 106.

The user device 100 or modem thereof may be configured to synchronize its own free-running timer to this timing. Of course, this timing is as observed at the modem and hence will include the propagation delay. However, the user device 100 or modem 101, 102 may be capable of learning this propagation delay at a later stage. The determination of the propagation delay will be known to those skilled in the art.

The 5G-NR modem 101 or the 5G-NR cell search module 301 may be further configured to provide for sending of system frame timing difference, SFTD, information for the first base station 104 to a network controller (not shown). The network controller may be an entity of the network located at the base stations, 104, 105, 106 or located as part of the wider network for which the base stations provide an air interface. The network controller may be a centralised entity or distributed over two or more components of the network. In one or more examples, the 5G-NR first base station 104 is co-located with the 4G E-UTRA second base station 105 and they may be considered as one single base station, even though they are two distinct entities connected via an X2 interface, for example. In one or more examples, the network controller comprises part of the 5G-NR first base station 104, which receives the SFTD information from the E-UTRA second base station 105 which receives it from the E-UTRA modem 102.

The 5G-NR modem 104 may be configured to provide for the sending of the SFTD information not by transmission by the radio transceiver circuitry 202 and antenna 201, but by sending the timing information, $t_k$ and respective $n_k$, to the co-located, second modem 102 of the user device 100—the E-UTRA modem 102—via the connection 103. Thus, the timing information may be sent by the wired connection 103 between the 5G-NR modem 101 and the 4G E-UTRA modem 102. Such a connection between the modems 101, 102 may be typical in non-standalone network implementations for exchange of information. However, the connection 103 is typically for exchange of non-time critical information and as such it may not be calibrated for time synchronisation.

In particular, the 5G-NR cell search module 301 may be configured to send said first timing information to the second, E-UTRA, modem 102 for determination and forwarding of the SFTD information by said E-UTRA modem 102 to the network controller using said first timing information received via the connection 103 and second timing information determined by the E-UTRA modem. The second timing information comprises one or more second times, $t_{LTE}$, indicative of the time of receipt of a respective one or more second radio frames from a second base station, that is the E-UTRA base station 105, and wherein each radio frame has encoded therein a second system frame number, SFN, m. It will be appreciated that the time $t_{LTE}$ may be measured relative to a network time established by the 4G E-UTRA network or, more generally, the communication network to which the 4G and 5G base stations 104-106 provide access. The network time may be derived by the second modem 102 using, at least in part, information encoded in the radio frames received thereby. Similar to as mentioned above in relation to the network time used by the 5G-NR modem 101, it will be appreciated that how the E-UTRA modem 102 obtains information to derive the network time will be known to those skilled in the art and is outside the scope of this disclosure.

It will be appreciated that on one or more examples, the network time of the 5G-NR network may be synchronised with the network time of the 4G E-UTRA network.

Thus, in one or more examples, the system frame timing difference, SFTD, information defined in the 3GPP specification TS38.215 may be determined and sent more efficiently by way of the 5G-NR modem 101 being configured to provide said first timing information through the software interface 103 to the E-UTRA modem 102 for the E-UTRA modem 102 to determine and forward the SFTD information on behalf of the 5G-NR modem 101.

The first timing information is in relation to the radio frames received from the first base station 104. However, as explained above, the 5G-NR cell search module 301 may be configured to receive radio frames from neighbouring base stations, such as the third base station 106. Accordingly, the 5G-NR modem 101 or 5G-NR cell search module 301 thereof may be configured to determine third timing information in respect of the third base station 106 and the radio frames received therefrom.

Thus, the 5G-NR cell search module 301 may be configured to determine third timing information, the third timing information comprising one or more third times, $t_k$ (where the value of k may be indicative of the base station to which the times relate), indicative of the time of receipt of a respective one or more radio frames, $n_{kn}$, from the 5G-NR, third base station 106, each radio frame having a third system frame number, SFN, the time $t_k$ measured relative to said network time.

Further, the 5G-NR modem 101 may be configured to provide for sending of system frame timing difference, SFTD, information for the third base station 106 to the network controller (the same network controller as for the SFTD information of the first base station 104 or a different one) by sending said third timing information to the second modem 102 for determination and forwarding of the SFTD information for the third base station, by said second modem 102, to the network controller, in a similar manner to as described above. The SFTD information may be determined using the third timing information and the second timing information. Accordingly, the SFTD information will be indicative of the timing difference between the 4G radio frames received by the E-UTRA modem 102 from the second base station 105 and the 5G radio frames received by the 5G-NR modem 101 from the third base station 106.

Figure 4:
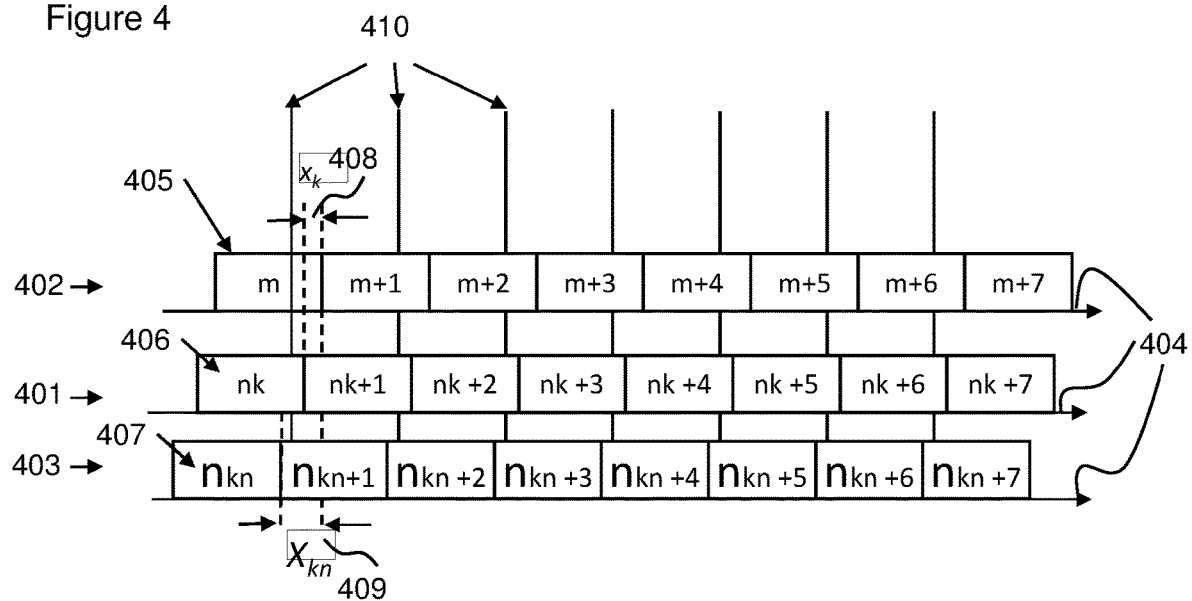
FIG. 4 shows example radio frames received by the E-UTRA modem and the 5G-NR modem from the base stations.

Turning to example FIG. 4, there is shown a plurality of first radio frames 401, also known as system frames, received by the 5G-NR modem 102 from first base station 104. Example FIG. 4 also shows a plurality of radio frames 402, also known as system frames, received by the 4G E-UTRA modem 102 from the second base station 105. Example FIG. 4 also shows a plurality of radio frames 403, also known as system frames, received by the 5G-NR modem 101 from the third base station 106. The plurality of radio frames are shown on an axis 404 representing time.

The plurality of first radio frames 401 have a plurality of different first system frame numbers, $n_k$, $n_k+1$, $n_k+2$, $n_k+3$, $n_k+4$ ... $n_k+7$, and so on. The time of receipt of said frames is designated $t_k$, where for the first base station k=0 and thus $t_0$. The plurality of second radio frames 402 have a plurality of different second system frame numbers, m, m+1, m+2, m+3, m+4 ... m+7, and so on. The time of receipt of said frames is designated $t_{LTE}$. The plurality of third radio frames 403 have a plurality of different first system frame numbers, $n_{kn}$, $n_{kn}+1$, $n_{kn}+2$, $n_{kn}+3$, $n_{kn}+4$ ... $n_{kn}+7$, and so on, in the example FIG. 4. The time of receipt of said frames is designated $t_k$ in the description that follows. However, it will be appreciated that the times for a first neighbouring base station may be designated $t_1$, the times for a second neighbouring base station may be designated $t_2$ and so on.

For every neighbouring 5G-NR cell or base station 106, SFTD information should be sent to the network controller of the communication network via the air interface of the 4G E-UTRA modem. The SFTD information comprises SFN offset information and frame boundary offset information defined as follows.

The system frame offset comprises information indicative of a difference between the second system frame number of one of the second radio frames 405 from the E-UTRA network, such as system frame number m, and the first system frame number of one of the first radio frames 406 comprising one that the start of which is received closest in time to the time said one of the second radio frame of the E-UTRA network is received by the E-UTRA modem 102, such as system frame number $n_k$.

Likewise, for the third base station 106, the system frame offset comprises information indicative of a difference between the second system frame number of one of the second radio frames 405 from the E-UTRA network, such as system frame number m, and the first system frame number of one of the third radio frames 407 comprising one that the start of which is received closest in time to the time said one of the second radio frame of the E-UTRA network is received by the E-UTRA modem 102, such as system frame number $n_{kn}$ 407.

Thus, using the language of the standard, the system frame offset, SFN offset=$(SFN_{PCell}-SFN_{PSCell})$ mod 1024, where $SFN_{PCell}$ is the system frame number of a PCell radio frame, namely the one of the second radio frames, and $SFN_{PSCell}$ is the system frame number of the PSCell radio frame, namely either the one of the first or third radio frames, of which the user device 100 receives the start closest in time to the time when it receives the start of the PCell radio frame.

Thus, in the example of FIG. 3, the SFN offset comprises SFN Offset=$m-n_k$ for the first base station 104. For the third base station, the SFN offset comprises SFN Offset=$m-n_{kn}$.

The frame boundary offset, $FBO_k$, comprises information indicative of a time difference between a start of a radio frame, such as radio frame m+1, received from the E-UTRA network and a start of one of the first radio frames, such as $n_k$, comprising one that the start of which is received closest in time to the time the received radio frame of the E-UTRA network is received.

Likewise, for the third base station 106, the frame boundary offset comprises information indicative of a time difference between a start of a radio frame, such as radio frame m+1, received from the E-UTRA network and a start of one of the third radio frames, such as $n_{kn}$, comprising one that the start of which is received closest in time to the time the received radio frame of the E-UTRA network is received.

Thus, using the language of the standard, the Frame boundary offset $FBO_k=\lfloor T_{FrameBoundaryPCell}-T_{FrameBoundaryPSCell}\rfloor/1000$, where $T_{FrameBoundaryPCell}$ is the time when the user device receives the start of a radio frame from the PCell, namely one of the second radio frames, and $T_{FrameBoundaryPSCell}$ is the time when the user device 100 receives the start of the radio frame of PSCell, namely one of the first or third radio frames, that is closest in time to the radio frame received from the PCell. The unit of $(T_{FrameBoundaryPCell}-T_{FrameBoundaryPSCell})$ is μs. The reference point for the observed SFN shall be the antenna connector of the UE.

Thus, in the example of FIG. 4, the frame boundary offset comprises $x_k$, shown by time difference 408 for the first base station 104 and second base station 105. In the example of FIG. 4, the frame boundary offset comprises $x_{kn}$, for radio frames from the third base station, is shown by time difference 409, for the third base station 106 and the second base station 105.

Example FIG. 4 also shows the network time used as a reference. In this example, the network time is shown as a plurality of ticks 410, which are every 10 ms and derived by the 5G-NR modem 101 and the E-UTRA modem 102 based on signalling from the respective base stations, as described in brief above.

The first timing information may comprise information indicative of the SFN of one of the first radio frames $n_k$ received closest to a particular tick 410. The first timing information may comprise information indicative of the time of receipt, $t_0$, of the one of the radio frames $n_k$ (such as the start thereof) relative to said particular tick 410.

The second timing information may comprise information indicative of the SFN of one of the second radio frames m received closest to the particular tick 410. The second timing information may include information indicative of the time of receipt, $t_{LTE}$, of the one of the second radio frames m (such as the start thereof) relative to said particular tick 410.

The third timing information may comprise information indicative of the SFN of one of the third radio frames $n_{kn}$ received closest to a particular tick 410. The third timing information may comprise information indicative of the time of receipt, $t_k$, of the one of the third radio frames $n_{kn}$ (such as the start thereof) relative to said particular tick 410.

Accordingly, with the first, second and third timing information defining the system frame number and the time of receipt relative to the ticks 410, the SFTD information, which relates to the SFN difference and time of receipt differences between first and second radio frames and the second and third radio frames, can be determined therefrom.

The 5G-NR cell search module 301 may provide the values $t_k$ (and $t_0$) and $n_k$ (and $n_{kn}$) to the 4G E-UTRA modem 102 via the interface 103.

The first, second and third timing information may be used by the E-UTRA modem 102 to determine the following:

In one or more examples, a Time Advance on the Pcell, $TA_{PCell}$, value is determined. The $TA_{PCell}$ value is determined by the second, E-UTRA modem 102. The $TA_{PCell}$ value represents the time of receipt of a start of one of the 4G E-UTRA radio frames from the second base station 105 by the E-UTRA modem 102 and measured relative to the closest tick 410. It will be appreciated by those in the art that such a value may be received as part of standard signalling message exchange that takes place during the Random Access Procedure (RACH), in initial access of the 4G network.

$$TA_{PCell} = t_{LTE} - SFNtick$$

where $t_{LTE}$ comprises the time of receipt of the start of one of the 4G E-UTRA radio frames and SFNtick comprises the time of the closest tick 410.

In one or more examples, a Time Advance on the primary 5G Pcell, $TA_{NR}$, value is determined. The $TA_{NR}$ value may be received by the 4G E-UTRA modem 102 from the second E-UTRA base station 105. The $TA_{NR}$ value represents the time of receipt of a start of one of the 5G-NR radio frames from the first base station 104 by the 5G-NR modem 101 and measured relative to the closest tick 410. In particular, $TA_{NR}$ may comprise a value computed by the 5G-NR first base station 104 and that is forwarded to the 4G E-UTRA second base station 105 (via the communication network of which they form part by, for example, the X2 interface) for sending to the 4G E-UTRA modem 102. Thus, the $TA_{NR}$ represents a propagation delay in the 5G radio frame with respect to the network time between the first base station 104 and the 5G-NR modem 101. The 5G-NR base station 104 may derive this delay from as part of standard signalling message exchange that takes place during a 5G Random Access Procedure (RACH).

$$TA_{NR} = t_0 - SFNtick$$

where $t_0$ comprises the time of receipt of the start of one of the 5G-NR radio frames and SFNtick comprises the time of the closest tick 410. Thus, $t_0$ is determined by the 5G-NR modem 101 as part of the cell search procedure and it is forwarded to the 5G-NR base station 104. The 5G-NR first base station may determine $TA_{NR}$ and pass the value to the communication network, such as using the X2 interface, and the $TA_{NR}$ value passes to the 4G E-UTRA modem 102 via the 4G E-UTRA second base station 105.

In one or more examples, a Time Offset $TO_k$ between one or more other detected 5G base stations (e.g. base station 106) and the primary 5G base station (e.g. base station 104) is determined. The base station 104, 106 with the greatest signal strength may be designated the primary base station 104. The $TO_k$ value may be determined by the first, 5G-NR modem 101 or the 4G E-UTRA modem 102. The $TO_K$ value may or may not be part of the third timing information. The $TO_k$ value represents the difference between the time of receipt of a start of one of the 5G-NR radio frames from the first base station 104 by the 5G-NR modem 101 and the start of one of the 5G-NR radio frames from the third base station 106 by the 5G-NR modem 101. In one or more examples, the $TO_k$ value may be measured by the 5G-NR cell search module 301.

$$TO_k = t_k - t_0$$

where $t_0$ comprises the time of receipt of the start of one of the 5G-NR radio frames from the first base station 104 (termed the primary base station in some examples) and $t_k$ comprises the time of receipt of the start of one of the 5G-NR radio frames from the third base station 106 (or any other additional neighbouring base stations).

Thus, in one or more examples, the first timing information determined by the 5G-NR modem 101 and forwarded to the 4G E-UTRA modem 102 may comprise one or more values of $TA_{NR}$ and the 5G-NR radio frame SFN associated with the radio frame used to determine the $TA_{NR}$ value. In other examples, $TA_{NR}$ is determined by the E-UTRA modem 102 and instead the first timing information comprises the times $t_0$ and the associated SFN.

The second timing information determined by the 4G E-UTRA modem 102 may comprise one or more values of $TA_{Pcell}$ and the 4G E-UTRA radio frame SFN associated with the radio frame used to determine the $TA_{Pcell}$ value. The third timing information determined by the 5G-NR modem 101 and forwarded to the 4G E-UTRA modem 102 may comprise one or more values of $TO_k$ and the 5G-NR radio frame SFN received from the third base station 106 associated with the radio frame used to determine the $TO_k$ value. In other examples, the third timing information determined by the 5G-NR modem 101 and forwarded to the 4G E-UTRA modem 102 may comprise the times $t_k$ which relate to the neighbouring base stations, such as third base station 106, and the associated SFN.

The 5G-NR modem 101 may pass the first timing information and, optionally, the third timing information to the 4G E-UTRA modem 102.

The E-UTRA modem 102 may be configured to determine the SFTD information comprising:

$$= TA_{NR} - TA_{Pcell}$$

In respect of the first base station 103.

The E-UTRA modem 102 may be configured to determine the SFTD information for the third base station as $FBO_k$ comprising:

$$FBO_k = t_k - t_0 - (TA_{Pcell} - TA_{NR})$$

Making substitutions it can be seen that:

$$FBO_k = t_k - t_0 - (t_{LTE} - SFNtick - t_0 + SFNtick)$$
$$= t_k - t_0 - (t_{LTE} - t_0)$$
$$= t_k - t_{LTE}$$

The $FBO_k$ value thus represents the time delay, expressed in common units (e.g. microseconds) between the 5G subframe boundary with respect to the 4G subframe boundary.

The $FBO_k$ value may be determined for each of the third or neighbouring 5G-NR base stations detected by the 5G cell search module 301.

The SFTD information comprises said $FBO_k$ value or values.

It will be appreciated that the SFN offset values may be based on the SFN included in the first and third timing information each in combination with the SFN included in the second timing information.

As mentioned above, the 5G-NR modem 101 may be from a different vendor compared to the 4G E-UTRA modem 101 and the modems 101, 102 may be installed in the user device 100 by the manufacturer of the user device 100.

In one or more examples, the 5G-NR modem 102 may be provided with software or firmware or any other computer program type that can be installed in memory of the 4G E-UTRA modem 102.

Figure 6:
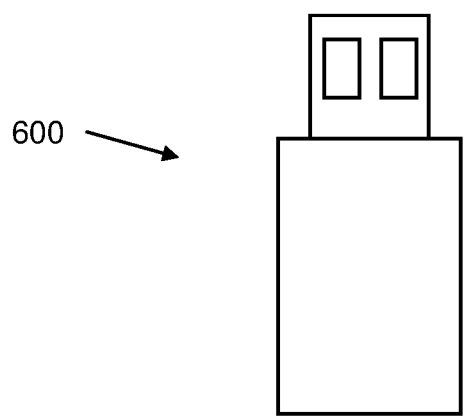
FIG. 6 shows an example computer readable medium.

Example FIG. 6 shows a computer readable medium or computer readable product 600, such as a non-transitory computer readable medium, containing computer program code. In this example the computer readable medium comprises a USB flash memory storage, but it may be provided in any non-transitory form. The computer program code contained thereon may be installed in a memory of the E-UTRA modem 102, for execution by a processor of the E-UTRA modem. The computer program code may provide the E-UTRA modem with the functionality to determine the SFTD information based on the first timing information from the 5G-NR modem 101 as well as to send the SFTD timing information to the network controller (not shown).

Thus, in summary, when said computer program code is executed by said E-UTRA modem 101 it will be configured to:

receive said first timing information $t_k$, $t_0$, $n_k$, $n_{kn}$ from the 5G-NR modem; determine SFTD information based on
(1) the first timing information received from the modem and
(2) second timing information determined by said E-TRA modem 102; and forward the determined SFTD information to the network controller (not shown).

Thus, the computer program enables the E-UTRA modem to receive the first timing information and, optionally, the third timing information and any other timing information for any other neighbouring 5G-NR base stations. The computer program may also enable the determined SFTD information to be forwarded to the network controller using the E-UTRA network, i.e. via the second, 4G E-UTRA, base station 102.

Turning now to the E-UTRA modem 102 of example FIG. 3, the first timing information and third timing information is received by a SFTD determination module 302. The SFTD determination module 302 may comprise a software module. It will be appreciated that in other embodiments the SFTD determination module 302 may comprise a hardware module, such as an ASIC or FPGA. In this example, the first timing information comprises the one or more times $t_0$ along with the SFNs $n_k$ associated with those one or more times. Further, in this example, the third timing information comprises the one or more times $t_k$ along with the SFNs $n_{kn}$ associated with those one or more times.

The SFTD determination module 302 may receive the second timing information from the E-UTRA Radio Resource Control (RRC) controller 213. Accordingly, $TA_{PCell}$ and $TA_{NR}$ may comprise part of the second timing information and therefore be provided to the SFTD determination module 302. The times $t_{LTE}$ may be provided to the RRC controller 213 from a 4G cell search model 214 based on 4G radio frames received by the E-UTRA modem 102. The 4G cell search module 214 may comprise a baseband module responsible for doing 4G base station detection along with the finding of the subframe indexes, SFN, m and the time when each subframe starts.

Figure 5:
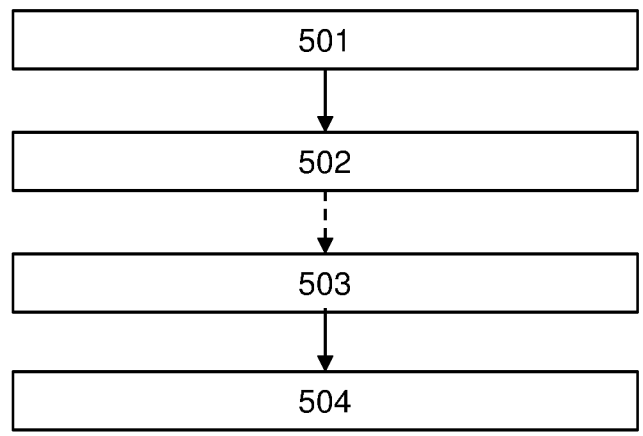
FIG. 5 shows an example flow chart illustrating a method.

Example FIG. 5 shows a flowchart illustrating an example method of operation of a user device comprising a modem for a 5G New Radio, 5G-NR, non-standalone network, the modem comprising a 5G-NR modem configured to receive radio frames from the 5G-NR network, the modem including a 5G-NR cell search module configured to perform the following method:

determining first timing information 501, the first timing information comprising one or more first times, $t_k$, indicative of the time of receipt of a respective one or more first radio frames, $n_k$, from a first base station of the 5G-NR network, each radio frame having encoded therein a first system frame number, SFN, the time $t_k$ measured relative to a network time established by the 5G NR network and derived by the modem using, at least in part, information encoded in the radio frames;

providing for sending of system frame timing difference, SFTD, information for the first base station to a network controller 502 by sending said first timing information to a second modem comprising an Evolved Universal Terrestrial Access, E-UTRA, network modem for determination and forwarding of the SFTD information by said second modem to the network controller using said first timing information and second timing information determined by the E-UTRA modem, the second timing information comprising one or more second times, $t_{LTE}$, indicative of the time of receipt of a respective one or more second radio frames, m, from a second base station of the E-UTRA network, each radio frame having encoded therein a second system frame number, SFN.

In one or more examples, the user device comprises the second E-UTRA modem configured to receive radio frames from the E-UTRA network, the modem comprising an interface configured to receive at least the first timing information from the 5G-NR modem and a determination module, the determination module configured to perform the following method:

determining SFTD information 503 based on the first timing information received via said interface and second timing information determined by the E-UTRA modem; and forwarding said SFTD information to a network controller 504 via a second base station of the E-UTRA network.

Thus, steps 501 and 502 may comprise steps actioned by the 5G-NR modem 101 and steps 503 and 504 may comprise steps actioned by the 4G E-UTRA modem 102.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A modem for a 5G New Radio (5G-NR) non-standalone network, the modem comprising a 5G-NR modem configured to receive radio frames from the 5G-NR network, the modem including a 5G-NR cell search module configured to:

determine first timing information, the first timing information comprising one or more first times, $t_k$, indicative of the time of receipt of a respective one or more first radio frames, $n_k$, from a first base station of the 5G-NR network, each radio frame having encoded therein a first system frame number (SFN), the one or more first times $t_k$ measured relative to a network time established by the 5G NR network and derived by the modem using, at least in part, information encoded in the radio frames; and provide for sending of system frame timing difference (SFTD) information for the first base station to a network controller by sending said first timing information to a second modem for an Evolved Universal Terrestrial Access (E-UTRA) network, the second modem comprising an E-UTRA modem for determination and forwarding of the SFTD information by said second modem to the network controller using said first timing information and second timing information determined by the E-UTRA modem, the second timing information comprising one or more second times indicative of the time of receipt of a respective one or more second radio frames, m, from a second base station of the E-UTRA network, each radio frame having encoded therein a second system frame number (SFN).

2. The modem of claim 1, wherein the 5G-NR cell search module is configured to:

determine third timing information, the third timing information comprising one or more third times, $t_k$, indicative of the time of receipt of a respective one or more third radio frames, $n_{kn}$, from a third base station, different to the first base station, of the 5G-NR network, each third radio frame having a third system frame number (SFN), the one or more third times $t_k$ measured relative to said network time established by the 5G NR network; and provide for sending of system frame timing difference (SFTD) information for the third base station to the network controller by sending said third timing information to the second modem for determination of the SFTD information for the third base station by said second modem, and forwarding to the network controller.

3. The modem of claim 2, wherein the first base station comprises the base station to which the modem is currently connected for transmitting and receiving of data and the third base station comprises a neighbouring 5G-NR base station to which the modem can form a connection during a handover process.

4. The modem of claim 2 wherein the SFTD information related to the third base station comprises:

a system frame offset comprising a difference between the second system frame number of one of the second radio frames from the E-UTRA network and the third system frame number of one of the third radio frames defined in the third timing information, said one of the third radio frames comprising one that the start of which is received closest in time to the time said one of the second radio frame of the E-UTRA network is received by the E-UTRA modem; and a frame boundary offset comprising a time difference between a start of one of the radio frames received from the E-UTRA network and a start of one of the third radio frames defined in the third timing information, said one of the third radio frames comprising one that the start of which is received closest in time to the time said one of the second radio frame of the E-UTRA network is received.

5. The modem of claim 1 wherein the SFTD information related to the first base station comprises:

a system frame offset comprising a difference between the second system frame number of one of the second radio frames from the E-UTRA network and the first system frame number of one of the first radio frames defined in the first timing information, said one of the first radio frames comprising one that the start of which is received closest in time to the time said one of the second radio frame of the E-UTRA network is received by the E-UTRA modem; and a frame boundary offset comprising a time difference between a start of a radio frame received from the E-UTRA network and a start of one of the first radio frames defined in the first timing information, said one of the first radio frames comprising one that the start of which is received closest in time to the time the received radio frame of the E-UTRA network is received.

6. The modem of claim 1 in combination with a computer program product, said computer program product comprising computer program code for storing in a memory of said E-UTRA modem to cause said E-UTRA modem, when said computer program code is executed thereby, to:

receive said first timing information from the 5G-NR modem;

determine SFTD information based on the first timing information received from the 5G-NR modem and second timing information determined by said E-UTRA modem; and forward the determined SFTD information to the network controller.

7. The modem of claim 1 wherein the 5G-NR modem is absent an E-UTRA network cell search module configured to determine said second timing information.

8. The modem of claim 1 in combination with said second modem to thereby form a non-standalone network user device.

9. The modem of claim 1 wherein the 5G-NR network and the E-UTRA network are both part of the same communication network and wherein the communication network provides a 5G-NR based connection to said communication network by the first base station and provides an E-UTRA based connection to said communication network by the second base station.

10. A modem for an Evolved Universal Terrestrial Access (E-UTRA) non-standalone network, the modem comprising a E-UTRA modem configured to receive radio frames from the E-UTRA network, the modem comprising an interface configured to receive at least first timing information from a 5G-NR modem for a 5G-NR network and a determination module, the determination module configured to:

determine SFTD information based on the first timing information received via said interface and second timing information determined by the E-UTRA modem; and forward said SFTD information to a network controller via a second base station of the E-UTRA network;

wherein said first timing information comprises one or more first times, to, indicative of the time of receipt, by the 5G-NR modem, of a respective one or more first radio frames, $n_k$, from a first base station of the 5G NR network, each radio frame having a first system frame number (SFN), the one or more first times to measured relative to a network time established by the 5G NR network; and wherein said second timing information comprises one or more second times indicative of the time of receipt, $t_{LTE}$, by said E-UTRA modem, of one or more second radio frames from the second base station of the E-UTRA network, each radio frame having a second system frame number (SFN), the one or more second times measured relative to a network time established by the E-UTRA network and derived by the modem using, at least in part, information encoded in the radio frames received by the E-UTRA modem.

11. The modem of claim 10 wherein the modem is configured to receive, via the interface, third timing information from the 5G-NR modem, the third timing information comprising one or more third times, $t_k$, indicative of the time of receipt of a respective one or more third radio frames, $n_{kn}$, from a third base station, different to the first base station, of the 5G-NR network, each radio frame having a third system frame number (SFN), the one or more third times $t_k$ measured relative to said network time established by the 5G NR network.

12. The modem of claim 11, wherein the modem is configured to determine:

a Time Advance on the Pcell, $TA_{PCell}$, value, wherein:

$$TA_{PCell}=t_{LTE}\text{-SFNtick}$$

wherein $t_{LTE}$ comprises the time of receipt of the start of one of the radio frames by the second modem and SFNtick comprises the time of a marker of the network time; and a Time Advance on the primary 5G Pcell, $TA_{NR}$, value wherein:

$$TA_{NR}=t_0\text{-SFNtick}$$

wherein $t_0$ comprises the time of receipt of the start of one of the 5G-NR radio frames from the first timing information and SFNtick comprises the time of the marker of the network time;

a Time Offset $TO_k$ between at least one other third base station and the first base station wherein:

$$TO_k=t_k-t_0$$

where $t_0$ comprises the time of receipt of the start of one of the 5G-NR radio frames from the first base station and $t_k$ comprises the time of receipt of the start of one of the 5G-NR radio frames from the third base station; and the second modem is configured to determine the SFTD information comprising one or both of:

$TA_{NR}-TA_{PCell}$ in respect of the first base station; and $$FBO_k=t_k-t_0-(TA_{PCell}-TA_{NR}).$$

13. The modem of claim 12, wherein the modem is configured to determine the value $TA_{NR}$ by receipt of $TA_{NR}$ from the second base station.

14. The modem of claim 10 comprising computer program code configured to be stored in memory of and executed by the modem, wherein the computer program code is configured to cause the E-UTRA modem to perform the receiving the at least first timing information, the determining the SFTD information, and the forwarding said SFTP information.

15. A method of operation of a user device comprising a modem for a 5G New Radio (5G-NR) non-standalone network, the modem comprising a 5G-NR modem configured to receive radio frames from the 5G-NR network, the modem including a 5G-NR cell search module configured to perform the following method:

determining first timing information, the first timing information comprising one or more first times, $t_k$, indicative of the time of receipt of a respective one or more first radio frames, $n_k$, from a first base station of the 5G-NR network, each radio frame having encoded therein a first system frame number (SFN), the one or more first times $t_k$ measured relative to a network time established by the 5G NR network and derived by the modem using, at least in part, information encoded in the radio frames; and providing for sending of system frame timing difference (SFTD) information for the first base station to a network controller by sending said first timing information to a second modem for an Evolved Universal Terrestrial Access (E-UTRA) network, the second modem comprising an E-UTRA modem for determination and forwarding of the SFTD information by said second modem to the network controller using said first timing information and second timing information determined by the E-UTRA modem, the second timing information comprising one or more second times, $t_{LTE}$, indicative of the time of receipt of a respective one or more second radio frames, m, from a second base station of the E-UTRA network, each radio frame having encoded therein a second system frame number, SFN.

16. The method of claim 15, wherein the user device comprises the second E-UTRA modem configured to receive radio frames from the E-UTRA network, the modem comprising an interface configured to receive at least the first timing information from the 5G-NR modem and a determination module, the determination module configured to perform the following method:

determining SFTD information based on the first timing information received via said interface and second timing information determined by the E-UTRA modem; and forwarding said SFTD information to the network controller via a second base station of the E-UTRA network.

* * * * *